(12) United States Patent
Olivieri

(10) Patent No.: US 9,771,094 B2
(45) Date of Patent: Sep. 26, 2017

(54) SHOPPING LIST ATTACHMENT AND HOLDER FOR A SHOPPING CART OR BASKET

(71) Applicant: GALS SHOPPER LLC, Lagrangeville, NY (US)

(72) Inventor: Michael Olivieri, Lagrangeville, NY (US)

(73) Assignee: GALS SHOPPER LLC, Lagrangeville, NY (US)

( * ) Notice: Subject to any disclaimer, the term of this patent is extended or adjusted under 35 U.S.C. 154(b) by 0 days.

(21) Appl. No.: 15/060,025

(22) Filed: Mar. 3, 2016

(65) Prior Publication Data

US 2016/0207557 A1    Jul. 21, 2016

Related U.S. Application Data

(63) Continuation-in-part of application No. 13/918,950, filed on Jun. 15, 2013, now abandoned.

(60) Provisional application No. 61/712,727, filed on Oct. 11, 2012.

(51) Int. Cl.
*B62B 3/00* (2006.01)
*B62B 3/14* (2006.01)

(52) U.S. Cl.
CPC .......... *B62B 3/1408* (2013.01); *B62B 3/1424* (2013.01); *B62B 3/1428* (2013.01)

(58) Field of Classification Search
CPC .... B62B 3/1408; B62B 3/1424; B62B 3/1428
USPC ........................................................ 224/411
See application file for complete search history.

(56) References Cited

U.S. PATENT DOCUMENTS

| | | | |
|---|---|---|---|
| 3,881,267 A | | 5/1975 | Hicks |
| 4,496,058 A | * | 1/1985 | Harris ..................... B43L 3/008 206/557 |
| D301,489 S | * | 6/1989 | Aquila .......................... D19/78 |
| 4,848,117 A | * | 7/1989 | Welborn ............... B62B 3/1428 211/45 |
| D313,629 S | * | 1/1991 | Hoffman ....................... D19/86 |
| 5,086,960 A | * | 2/1992 | Schwietzer ........... B62B 3/1428 224/277 |
| 5,176,392 A | * | 1/1993 | Graebe, Jr. ........... B62B 3/1428 108/152 |
| 5,192,041 A | | 3/1993 | Bryant |
| 5,566,609 A | * | 10/1996 | Kirschner ............. B62B 3/1428 108/42 |
| D405,820 S | * | 2/1999 | Larson ........................... D18/2 |
| 5,924,736 A | * | 7/1999 | Russo ................... B42D 5/042 281/15.1 |

(Continued)

OTHER PUBLICATIONS www.engageinstore.com, defunct Internet webpage, past versions of webpage accessible via www.archive.org's internet wayback machine.

*Primary Examiner* — Peter Helvey
(74) *Attorney, Agent, or Firm* — Robert M. Cox, Esq.

(57) ABSTRACT

A shopping cart list holder includes a central list backing support, a support neck, and a cart attachment. The list holder is adapted so that it is easy to attach to a shopping basket or shopping cart. The list holder is designed to hold one or more pieces of paper to the backing support so that the user does not have to fumble between his pockets and the shopping cart or basket for his shopping list. The list holder may also include holders for cell phones, tablets or pens.

7 Claims, 14 Drawing Sheets

(56) References Cited

U.S. PATENT DOCUMENTS

| | | | | |
|---|---|---|---|---|
| 6,250,006 B1* | 6/2001 | Berrier | ............... | B42F 13/12 |
| | | | | 40/308 |
| 6,299,199 B1 | 10/2001 | Dunning | | |
| 7,219,822 B2* | 5/2007 | Chretien | ............... | B62B 3/1428 |
| | | | | 224/331 |
| 7,584,559 B2* | 9/2009 | Agudelo | ............... | B42D 5/005 |
| | | | | 248/346.03 |
| 7,895,777 B2* | 3/2011 | Crum | ............... | B62B 3/1408 |
| | | | | 40/308 |
| 8,256,651 B2* | 9/2012 | Reynolds | ............... | B62B 3/1428 |
| | | | | 224/275 |
| 8,534,520 B1* | 9/2013 | Liparoti | ............... | B62B 3/1428 |
| | | | | 224/277 |
| 8,757,666 B1* | 6/2014 | Santore | ............... | B43L 1/008 |
| | | | | 224/411 |
| 8,905,305 B2* | 12/2014 | Crum | ............... | G06Q 30/06 |
| | | | | 235/375 |
| 9,126,616 B2* | 9/2015 | Crum | ............... | B26B 5/00 |
| 2004/0069918 A1* | 4/2004 | McKinney | ............... | B62B 3/1428 |
| | | | | 248/274.1 |
| 2010/0200629 A1* | 8/2010 | Reynolds | ............... | B62B 3/144 |
| | | | | 224/411 |
| 2011/0080660 A1 | 4/2011 | Kerle | | |
| 2013/0313297 A1* | 11/2013 | Belby | ............... | B62B 3/1428 |
| | | | | 224/411 |
| 2014/0339278 A1* | 11/2014 | Ditore | ............... | B62B 5/00 |
| | | | | 224/411 |
| 2015/0108190 A1* | 4/2015 | Crum | ............... | B26B 5/00 |
| | | | | 224/411 |
| 2016/0107668 A1* | 4/2016 | Robins | ............... | B62B 3/1472 |
| | | | | 224/411 |
| 2016/0185375 A1* | 6/2016 | Yu | ............... | B62B 3/146 |
| | | | | 224/411 |

* cited by examiner

SHOPPING LIST ATTACHMENT AND HOLDER FOR A SHOPPING CART OR BASKET

CROSS REFERENCE TO RELATED APPLICATIONS

The present application claims benefit as a continuation-in-part of U.S. Nonprovisional application Ser. No. 13/918,950 dated Jun. 15, 2013 titled "Shopping List Attachment and Holder for a Shopping Cart or Basket" with Michael Olivieri as the sole inventor, which is incorporated herein by reference.

FIELD OF THE INVENTION

The field of the present invention generally relates to attachments and accessories for shopping carts and baskets of all shapes and sizes.

BACKGROUND OF THE INVENTION

People regularly use shopping carts or shopping baskets when shopping at stores. Shopping baskets and carts make it easier to store items while continuing shopping. People also rely on shopping lists when shopping. While these lists are useful, they can often get in the way during the shopping experience. Customers need to use at least one hand for the shopping basket or cart and at least one hand to retrieve items from the counters and shelves of the store. This means that a customer is likely to place the shopping list in his pockets or wallet where he cannot readily refer to it or place it in the shopping cart or basket where it might get lost among the merchandise.

What is needed is a way to revolutionize the shopping experience so that shoppers do not have to look down at lists and reach in their pockets repeatedly causing them frustration, bumping carts, passing friends, and missing valuable shopping time.

What is needed is a smarter way to shop. Retailers will enjoy providing additional customer value and satisfaction while manufactures will enjoy providing retailers with this value-adding accessory.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with the use of shopping lists with shopping carts or baskets, a shopping cart list holder is introduced. The shopping cart list holder is an attachment designed to be connected to any shopping cart, shopping basket, stroller, wheelchair, motorized wheelchair and can hold the customer's shopping list. The list holder may optionally include quick release and or anti-vibration features to better secure its attachment. The list holder keeps the shopping list within the eyesight of the customer without requiring him to hold it, thus freeing up his hands for controlling the cart or basket and reaching to select merchandise from the aisles. The shopping cart list holder may use a variety of ways to secure the shopping list to the list holder. These include but are not limited to a clip or set of clips, flaps, sleeves, or adhesives, or any combination thereof. The list holder may optionally include additional holders for water bottles or cell phones or other devices commonly referred to or used during shopping. In particular, the list holder may optionally include a customized enclosed slide casing to allow for a secure, universal fit for a variety of smartphones or tablets or other portable electronic devices. Such slide casing may optionally include a specially selected grip material to enhance the friction of surfaces contacting the smartphone or tablet or other electronic device. The list holder may optionally include an offset raised hinge to allow sufficient clearance between the leaves of the holder for the holder to be fully closed while a smartphone or tablet or other electronic device remains attached. The list holder may optionally include additional holders for pens or pencils or stylus or other writing or marking implements commonly used with paper, smartphones, tablets or portable electronic devices. The shopping list holder is ideally light and compact, weighing as little as is possible, preferably less than a pound, and having a height, width and depth comparable to that of a small book or large portable electronic device. The shopping list holder may be made of plastic, reinforced plastic, and/or metal may include features to enhance strength without adding significant weight.

BRIEF DESCRIPTION OF THE DRAWINGS

Preferred and alternative examples of the present invention are described in detail below with reference to the following Figure drawings.

DETAILED DESCRIPTION

Figure 1:
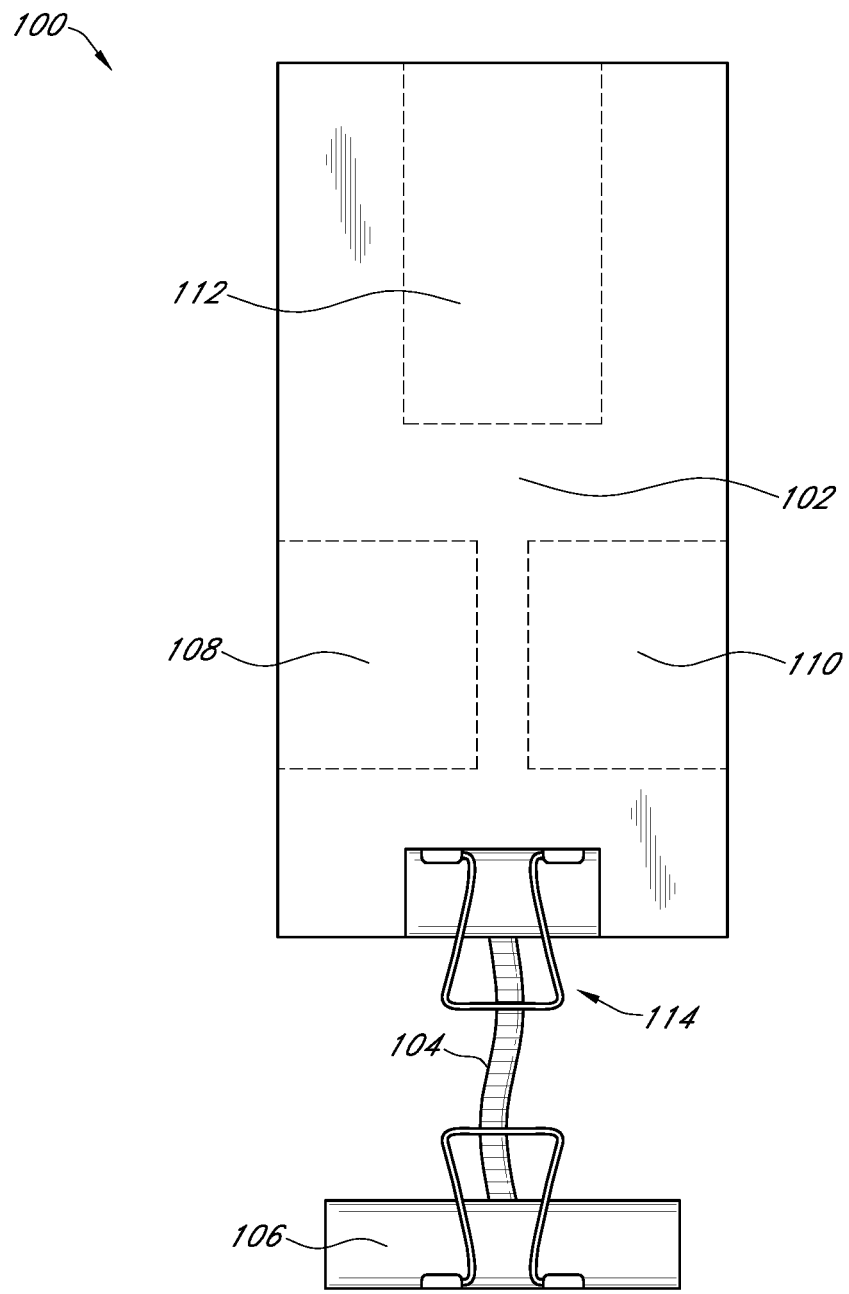
FIG. 1 illustrates a shopping cart list holder in accordance with the present invention.

In accordance with an exemplary embodiment of the present invention, FIG. 1 illustrates a shopping cart list holder 100 capable of holding one or a few pieces of paper. In the present embodiment, the list holder has three principal sections: the central list backing support 102, the support neck 104, and the cart attachment 106. In an embodiment of the present invention the central list backing support 102 may be six inches long, three inches wide, and connect to a two-inch long flexible support neck 104.

The central list backing 102 support further contains means for holding the piece or pieces of paper in place. In the present embodiment, the means for holding is a set of three expandable flaps with one flap (108, 110) on opposing sides of the backing support and one expandable upper flap 112 at the top of the backing support 102. The present invention may use sets of magnets in the flaps (108, 110, 112) and in the backing support 102 to hold the flaps (108, 110, 112) to the backing support 102 to keep the shopping list in place. Alternatively or in addition to, the flaps (108, 110, 112) may be attached to the central backing support 102 in such a way that pressure is maintained on the shopping list that keeps it firmly in place. The present invention is by no means limited to these approaches. Other approaches may be taken to secure the piece or pieces of paper to the backing support 102. For example, the backing support 102 may include a translucent sleeve in which the piece or pieces of paper may be inserted. Furthermore, embodiments of the present invention may use any combination of clips, flaps, or adhesives in the design of the backing support 102 to secure the piece or pieces of paper. For instance, the number and size and design of the expandable support flaps may vary from embodiment to embodiment. A finger press list holder 114 is also used to secure a list to the central list support backing 102.

In an embodiment of the present invention, the backing support has only one flap on one side (and it may be placed on either side) that is positioned one inch from the bottom. The flap may be a plastic tension slide. The flap is flexible enough to allow for additional thickness such as a smart phone or tablet and tight enough to secure paper. It may be a double layer tension clip with a length of one half inch.

In an embodiment of the present invention, the support neck 104 connects the backing support 102 to the cart attachment 106. In FIG. 1, the support neck 104 is flexible and therefore allows the backing support 102 a certain range of movement when it is attached via the cart attachment 106 to either a shopping cart or shopping basket. In other embodiments the support neck 104 may be rigid or semi rigid and, thereby, hold the backing support 102 more firmly in place. The support neck 104 may be of varying lengths. Also, the support neck 104 may have an adjustable length. For instance, the support neck 104 may be attached to the backing support 102 or the cart attachment 106 via an auto-rewinding spool. This auto-rewinding spool would allow the user to select the length of the support neck 104.

In the embodiment of FIG. 1, the support neck 104 is made of a lightweight cord but the present invention is not so limited. In other embodiments, the support neck 104 may be made of any type of material in the form of a tape or ribbon capable of holding the backing support to the cart attachment.

The support neck 104 may be connected to the backing support 102 and the cart attachment 106 in a variety of ways. In an embodiment of the present invention, the support neck 104, backing support 102, and cart attachment 106 may all be made out of the same piece of material and, therefore, not require any additional means of connecting the three components. In other embodiments, the three components may be made out of different pieces of material and the support neck may be connected to the other components through the use of hinges or by using adhesives or staples or some other means capable of holding the list holder together under normal use and storage conditions.

The cart attachment 106 is responsible for securing the list holder 100 to the shopping cart or shopping basket. In the embodiment shown in FIG. 1, the cart attachment 106 is an openable and closable tube clamp sized to be able to fit snugly around the bars of a typical shopping cart or shopping basket. The clamp is designed to be operated by the user by pressing on the tube with his fingers. In the present embodiment, the clamp is coated with an agent that helps the clamp grip the bar and keep the list holder in place. The clamp's opening mechanism of the cart attachment is of such a resistance (that is, the ability to maintain its position or difficulty to be opened or closed) that it is easy enough for any user of a shopping cart to open and close but resistant enough that it does not accidentally open under normal use.

The cart attachment 106 may include a clamp of any shape or size capable of affixing the list holder 100 to the bar of a shopping cart or shopping basket. Furthermore, the cart attachment 106 may rely on hooks that are capable of attaching the list holder to a shopping cart or shopping basket. Also, the cart attachment 106 may rely on an adhesive that allows the list holder to be "taped" to the shopping cart or shopping basket. In an embodiment of the present invention, the clamp may be a finger clip that is pressed to open from a closed tension position and then let go to provide grip and tension with enough flexibility to allow for tight closure around the bar of any shopping cart or shopping basket.

Figure 2:
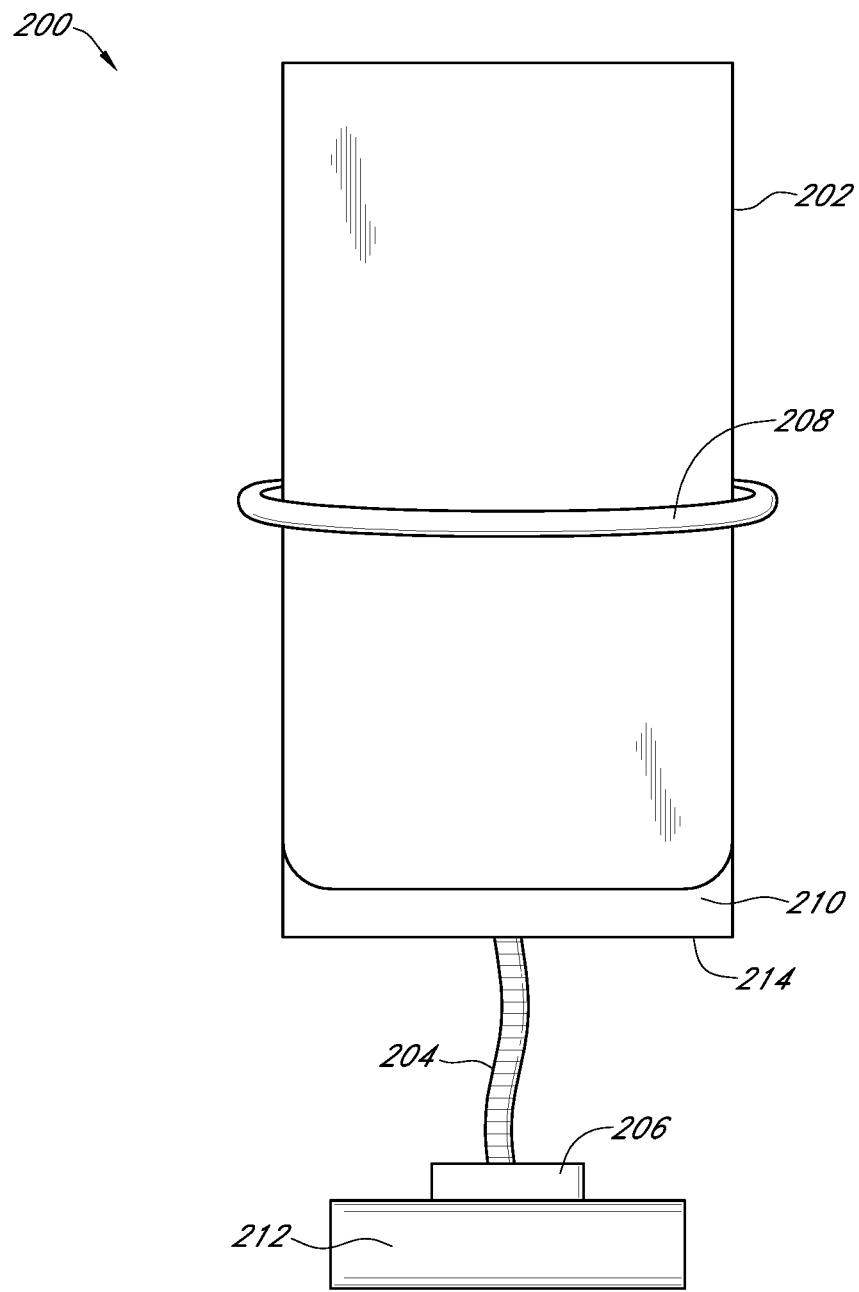
FIG. 2 illustrates a shopping cart list holder with additional capacity in accordance with the present invention.

FIG. 2 illustrates a shopping cart list holder 200 further capable of holding a water bottle and a pen. In the present embodiment, the list holder 200 has three principal sections: the central list backing support 202, the support neck 204, and the cart attachment 206. The central list backing support 202 further contains means for holding the piece or pieces of paper in place. In the present embodiment, the means for holding is a set of three expandable flaps with one flap on opposing sides of the backing support and one expandable upper flap at the top of the backing support. The present invention is by no means so limited. Other approaches may be taken to secure the piece or pieces of paper to the backing support. For example, the backing support may include a translucent sleeve in which the piece or pieces of paper may be inserted. Furthermore, embodiments of the present invention may use any combination of clips, flaps, or adhesives in the design of the backing support to secure the piece or pieces of paper. For instance, the number and size and design of the expandable support flaps may vary from embodiment to embodiment.

The backing support 202 also includes means for holding a water bottle or handheld device, including but not limited to, a cell phone to the list holder 200. In the embodiment of FIG. 2, the means for holding a water bottle or handheld device is a flexible straps 208 that bind the water bottle or handheld device to the backing support 202. The strap 208 may be designed in a variety of ways. It may be a single expandable band which allows the user to slide the water bottle or handheld device between the band and the backing support and which has enough tension to keep the water bottle or handheld device in place. In another embodiment, the strap may include a Velcro connector which allows the user to adjust the tightness of the strap around the water bottle or handheld device to keep it securely in place. The holding means also may be a clip for holding the water bottle or cell phone to the list holder.

In the embodiment of FIG. 2, the backing support 202 also includes a pen holder 210. The pen holder 210 is located on the backing support 202 where the backing support 202 is attached to the support neck 204. In the present embodiment, the pen holder 210 is part of a clip used to secure the piece or pieces of paper to the backing support 202. The pen holder 210 may be made out of molded plastic that is an incomplete tube which is semi-rigid and allows the user to "snap" the pen into place by gently pushing the pen into place. The pen holder 210 may also use strap or straps to hold the pen into place. Furthermore, while the pen holder 210 is shown as being located near the connection of the backing support to the support neck, the present invention is by no means so limited. It may be located on either side of the backing support 202, away from the support neck 204 or on the other side of the backing support 202.

In an embodiment of the present invention, the support neck 204 connects the backing support to the cart attachment. In FIG. 2, the support neck 204 is flexible and therefore allows the backing support 202 a certain range of movement when it is attached via the cart attachment 206 to either a shopping cart or shopping basket. In other embodiments the support neck 204 may be rigid or semi rigid and, thereby, hold the backing support 202 more firmly in place. The support neck 204 may be of varying lengths. Also, the support neck 204 may have an adjustable length. For instance, the support neck 204 may be attached to the backing support 202 or the cart attachment 206 via an auto-rewinding spool. This auto-rewinding spool would allow the user to select the length of the support neck 204.

In the embodiment of FIG. 2, the support neck 204 is made of a lightweight cord but the present invention is not so limited. In other embodiments, the support neck 204 may be made of any type of material in the form of a tape or ribbon capable of holding the backing support 202 to the cart attachment 206.

The support neck 204 may be connected to the backing support 202 and the cart attachment 206 in a variety of ways. In an embodiment of the present invention, the support neck 204, backing support 202, and cart attachment 206 may all be made out of the same piece of material and, therefore, not require any additional means of connecting the three components. In other embodiments, the three components may be made out of different pieces of material and the support neck may be connected to the other components through the use of hinges or by using adhesives or staples or some other means capable of holding the list holder together under normal use and storage conditions.

The cart attachment 206 is responsible for securing the list holder 200 to the shopping cart or shopping basket. In the embodiment shown in FIG. 2, the cart attachment 206 is an openable and closable tube clamp 212 sized to be able to fit snugly around the bars of a typical shopping cart or shopping basket. The clamp 212 is designed to be operated by the user by pressing on the tube with his fingers. In the present embodiment, the clamp 212 is coated with an agent that helps the clamp grip the bar and keep the list holder 200 in place. The clamp's opening mechanism of the cart attachment 206 is of such a resistance (that is, the ability to maintain its position or difficulty to be opened or closed) that it is easy enough for any user of a shopping cart to open and close but resistant enough that it does not accidentally open under normal use.

The cart attachment 206 may include a clamp of any shape or size capable of affixing the list holder 200 to the bar of a shopping cart or shopping basket. Furthermore, the cart attachment 206 may rely on hooks that are capable of attaching the list holder 200 to a shopping cart or shopping basket. Also, the cart attachment 206 may rely on an adhesive that allows the list holder 200 to be "taped" to the shopping cart or shopping basket. In an embodiment of the present invention, the clamp may be a finger clip that is pressed to open from a closed tension position and then let go to provide grip and tension to hold item with enough flexibility within the tension to allow for tight closure around the bar of any shopping cart or shopping basket.

In an embodiment of the present invention, the cart attachment clamp 212 is two inches long with a radius that fits handle bar (normally about one inch in diameter). It may be made with flexible metal wire with a flexible protective rubber coating. The cart attachment clamp 212 may have a neck that is two inches long and a quarter inch wide. The neck may have a variety of designs. It may be circular or it may have a squared design.

The entire assembly of the list holder 200 is designed to weigh less than one pound. As mentioned before, a clamp 214 may be used to secure items to the backing support 202. In an embodiment of the present invention, the clamp 214 may include a chrome tension spring, chrome joint axle, or plastic hinges. The clamp 214 may include a plastic finger press for opening the clamp 214. Any clamp or other securing component on the list holder 200 may include a rubber coating to better secure its contents.

The shopping cart list holder may be made out of plastic, wood, or some other material suited to handle the wear-and-tear that the list holder might face. The list holder may also be decorated in some fashion. The list holder may be colored. For example, it may be either white or pink. The present invention is not so limited. It may be multicolored or decorated with patterns or writing or with logos. The decoration could be tied to the store or shopping center for which the list holder is used. Also, it may be an advertisement for any product or service. The list holder may be designed in such a way that decoration could be added to or replaced on the list holder.

Figure 3:
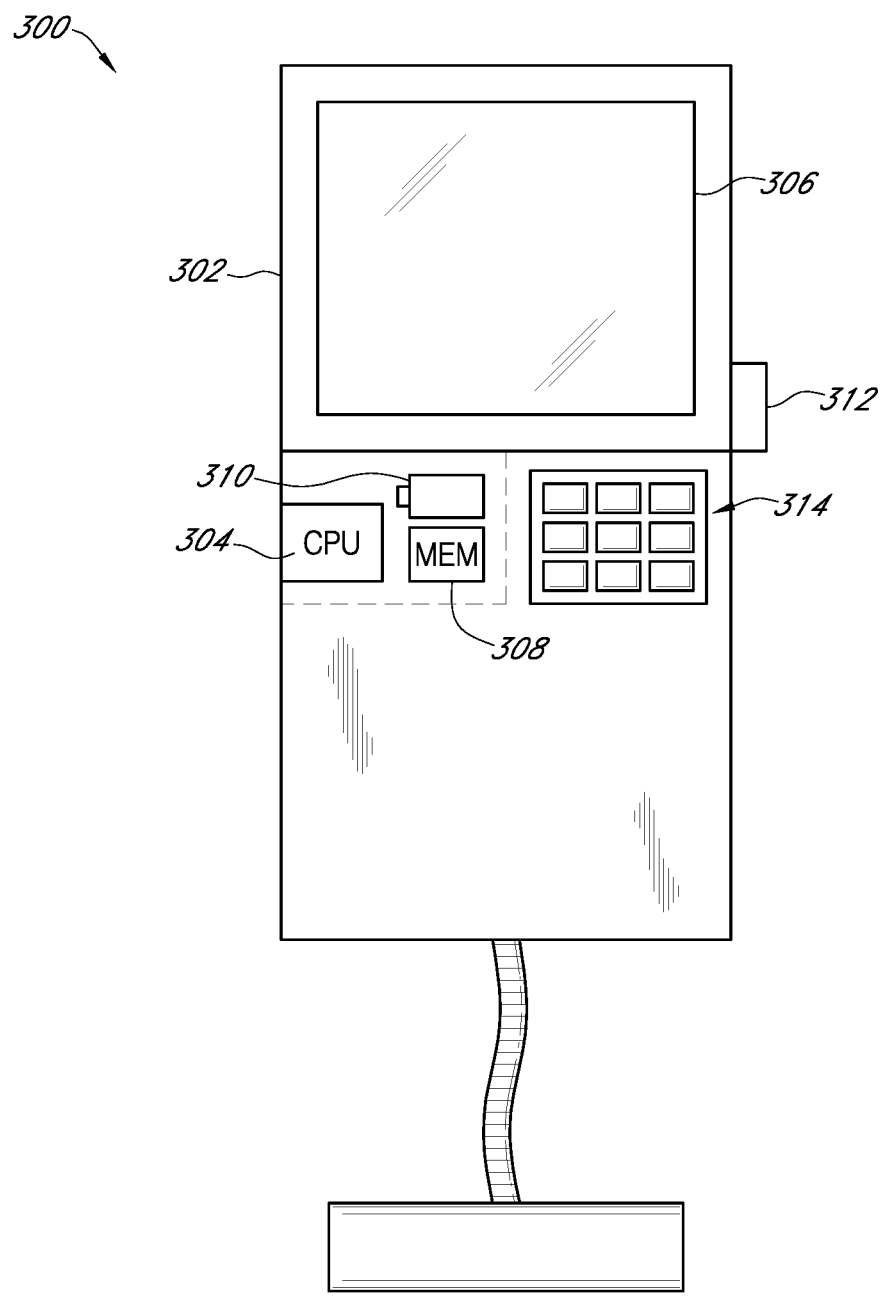
FIG. 3 illustrates a shopping cart list holder with a small screen in accordance with the present invention.

FIG. 3 shows an embodiment of the present invention where the list holder 300 also includes a digital device 302 that provides additional features for the customer. The digital device may include a microprocessor 304 along with a small screen 306 and memory 308 and a power supply 310. It may or may not include some kind of user input controls 314 to allow the user to interact with the electronic device. To load information onto the digital device, the device may include either a wireline connection such as a mini-USB connector or a wireless interface (such as WIFI or infra-red) 312. The digital device 302 may display uploaded user choices, the customer shopping list, or targeted choices or items on special. Furthermore, the retailer may also load programs to ease in navigation of the store. For instance, the retailer may load isle locations for items on the customer's. The screen 306 may also show digital advertising.

Figure 4:
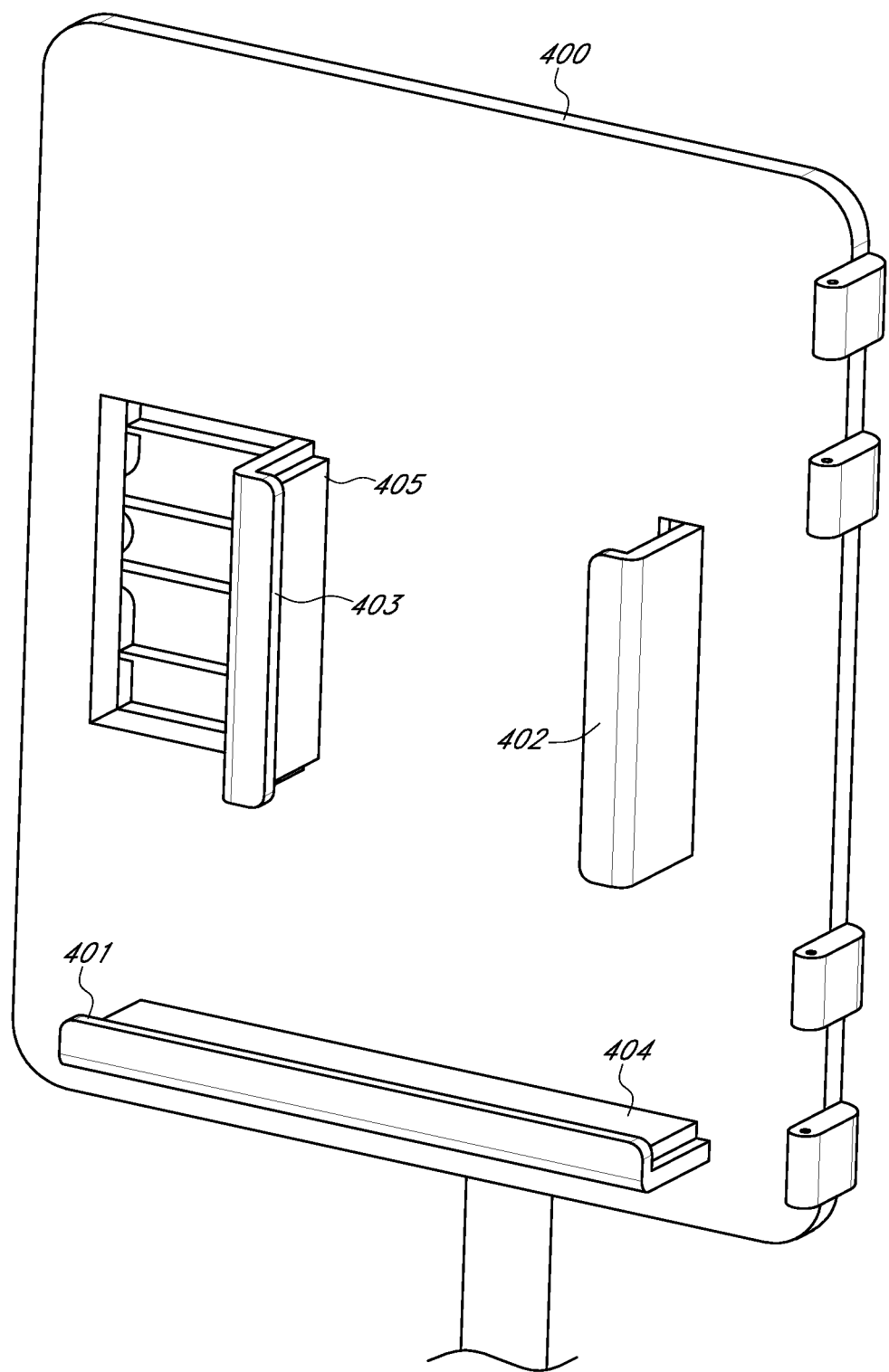
FIG. 4 illustrates a three prong holder system for secure mounting of smartphones tablets or other small devices in accordance with the present invention.

In a further embodiment of the present invention, FIG. 4 illustrates a three prong holder system 400 for securely mounting smartphones, tablets or other portable electronic devices in accordance with the present invention. As illustrated, the bottom prong 401 and one side prong 402 are fixed, with the second side prong 403 having a securely adjustable distance from the other side prong, to adapt to securely hold devices of a variety of widths. The gripping surface of the prongs 404, 405 may present a specially selected grip material to enhance the friction of the grip. The specially selected grip material may be an ABS plastic special adherence material, TPE or another other rubberized coating with gripping and/or anti-vibration properties.

Figure 5:
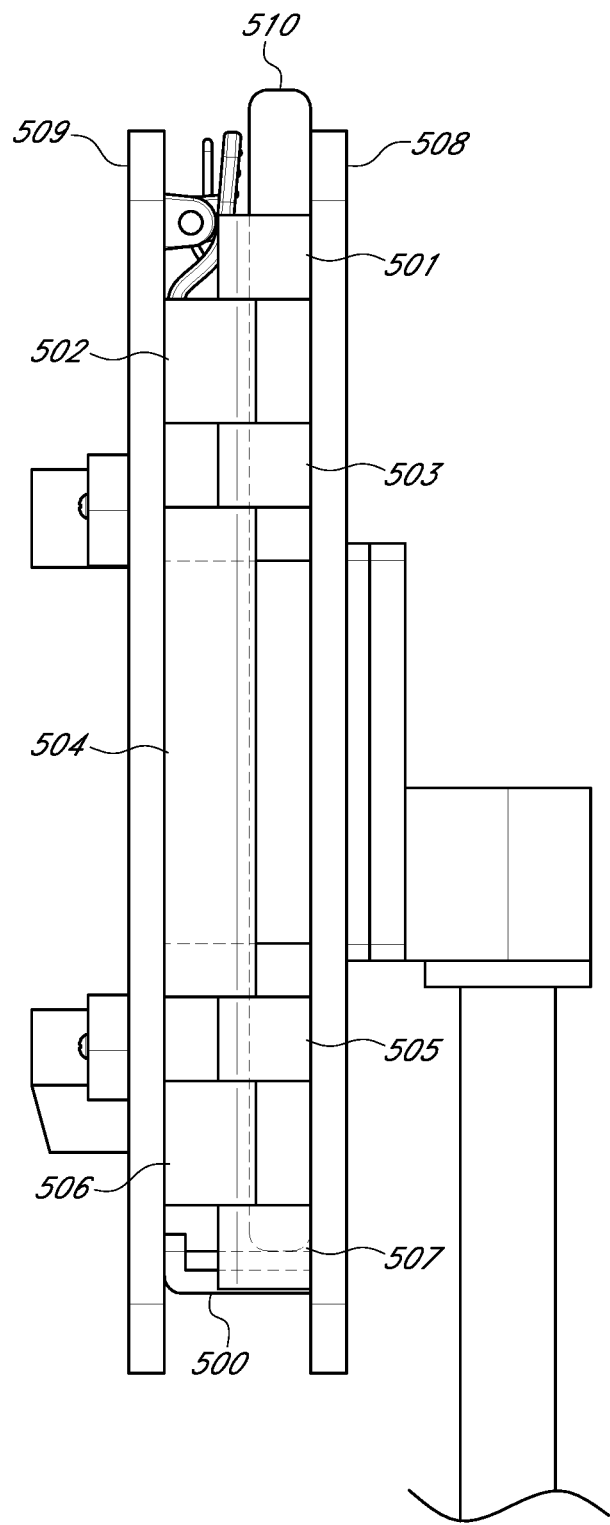
FIG. 5 illustrates an offset raised hinge joint in accordance with the present invention.

In a further embodiment of the present invention, FIG. 5 illustrates an offset raised hinge joint in accordance with the present invention. As illustrated, a central hinge pin connects a series of raised interlocking knuckles 501, 502, 503, 504, 505, 506, 507. The offset may be configured to allow sufficient clearance between the central backing support 508 and moveable list backing support 509 for the holder to be fully closed while a smartphone, tablet or other electronic device 510 remains attached. The offset may also be configured to allow sufficient clearance for the mounting prongs (e.g. the bottom prong 500) to remain fixed while the holder in closed. The offset may also be configured to allow sufficient clearance between the leaves of the holder for the holder to be fully closed while a note pad or other paper is clipped into the moveable list backing support.

Figure 6:
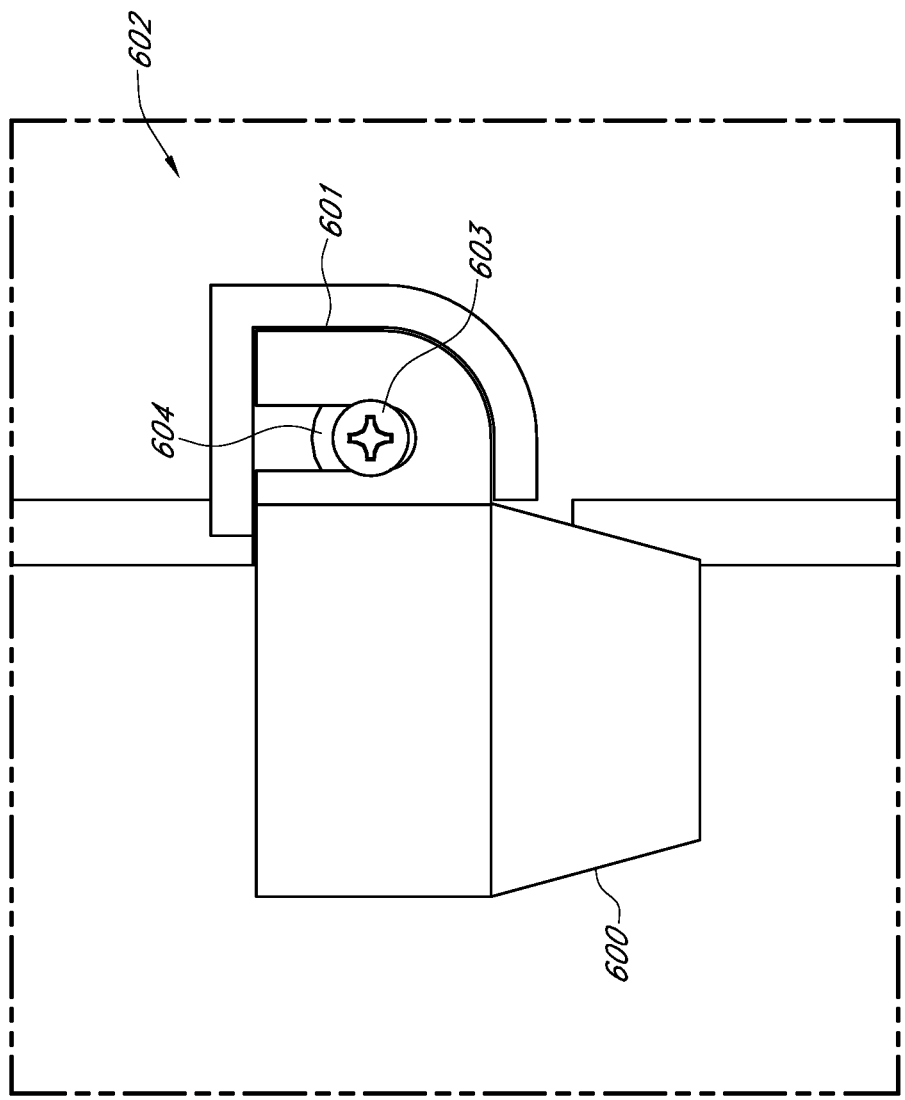
FIG. 6 illustrates a tapered pipe shaped design for a pen holder with u-shaped handle for mounting in accordance with the present invention.

In a further embodiment of the present invention, FIG. 6 illustrates a tapered pipe design 600 for a pen holder element with a novel u-shaped handle 601 for mounting to a raised post 604 on the backing plate 602 with a screw 603 in accordance with the present invention. In a particular embodiment, the screw is a self-tapping screw to be threaded into a plain bore integral to the raised post on the backing plate. The tapered pipe element 1203 may be accompanied by one or more co-linear straight-pipe shaped pen holder elements 1204, to provide multiple points of support along the pen or stylus.

Figure 7:
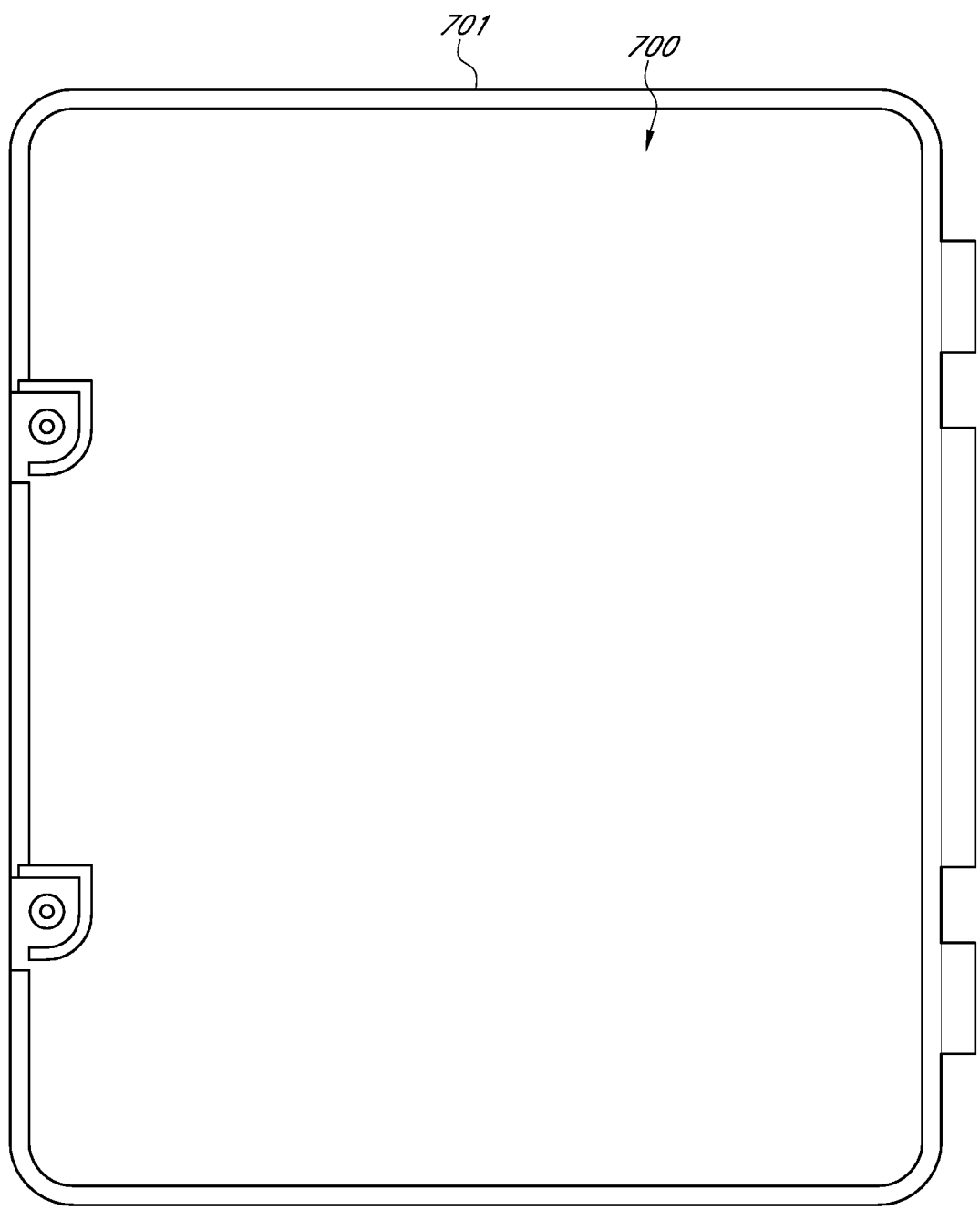
FIG. 7 illustrates a holder support panel backing with a raised ridge in accordance with the present invention.

In a further embodiment of the present invention, FIG. 7 illustrates a holder support panel backing 700 with a raised ridge 701 in accordance with the present invention. The raised ridge may further enhance the strength of an otherwise flat support backing, it may prevent scratching to the flat plane of the support backing, and as well it may improve shock absorption and force distribution upon impact, if the device is accidentally dropped or bumped.

Figure 8:
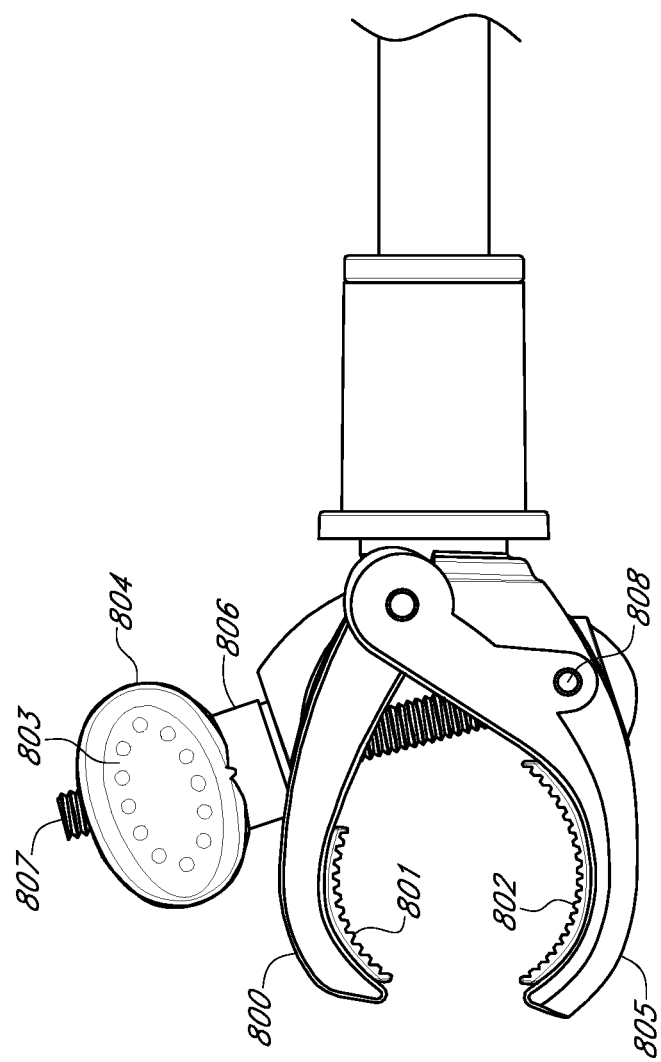
FIG. 8 illustrates a unique quick release clamp for attachment of the gooseneck connection to the shopping cart, shopping basket, stroller, wheelchair or motorized wheelchair.

In a further embodiment of the present invention, FIG. 8 illustrates unique quick release clamping jaws 800, 805 for attachment of the gooseneck connection to the shopping cart, shopping basket, stroller, wheelchair or motorized wheelchair. The quick release clamp may provide cushioned grip 801, 802 and/or point of contact gripping allowing the clamp to securely adhere and hold the smooth surface of a round tubular rod or handle or other intended attachment point such as a flat bar or plate. The unique contour 803 of the thumb-screw 804 allows for limited effort to effectively tighten the thumb screw clamp. The locking mechanism of the clamp has a range of motion design using an elongated opening in the upper clamp jaw. In a particular embodiment of the present invention, the thumb-screw mechanism 806 comprises a nut and the threaded bolt 807 is securely attached to the lower clamp jaw 805 by means of a pin 808 inserted perpendicular to the axis of the bolt through a cross-drilled hole in both the bolt-head and lower clamp jaw to allow the bolt angle to adapt dynamically as the clamping jaw changes position based on the nut height.

Figure 9:
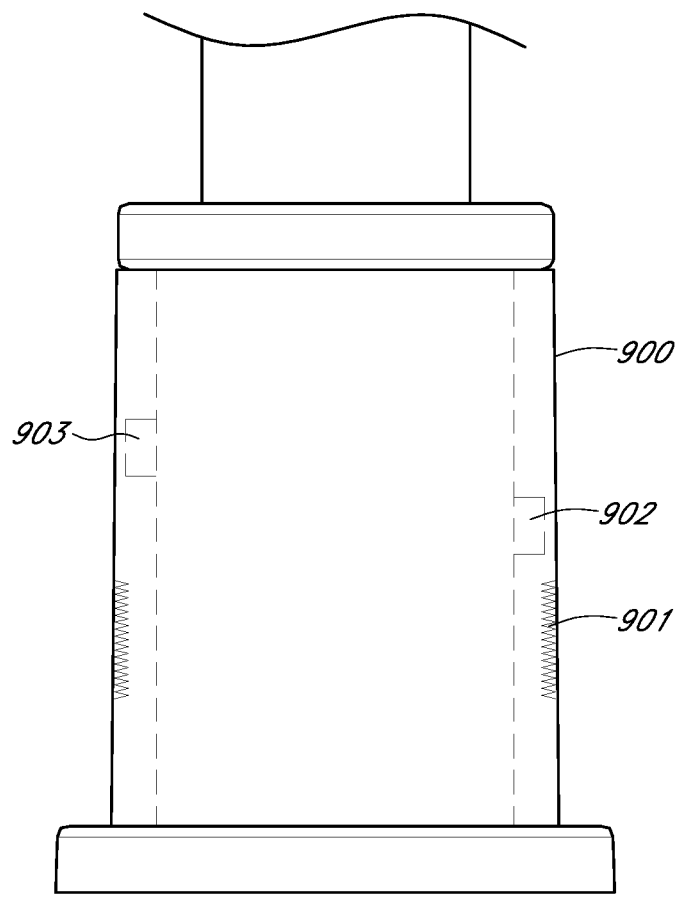
FIG. 9 illustrates a gooseneck connection locking joint with anti-vibration feature for attachment to the quick release clamp or other temporary attachment point in accordance with the present invention.

In a further embodiment of the present invention, FIG. 9 illustrates a gooseneck connection locking joint 900 with anti-vibration feature 901 for attachment to the quick release clamp or other temporary attachment point in accordance with the present invention. In a further embodiment of the present invention, the locking joint comprises notched grooves 902, 903 fitting into an enclosed casing, providing a shock-free and shake-free action.

Figure 10:
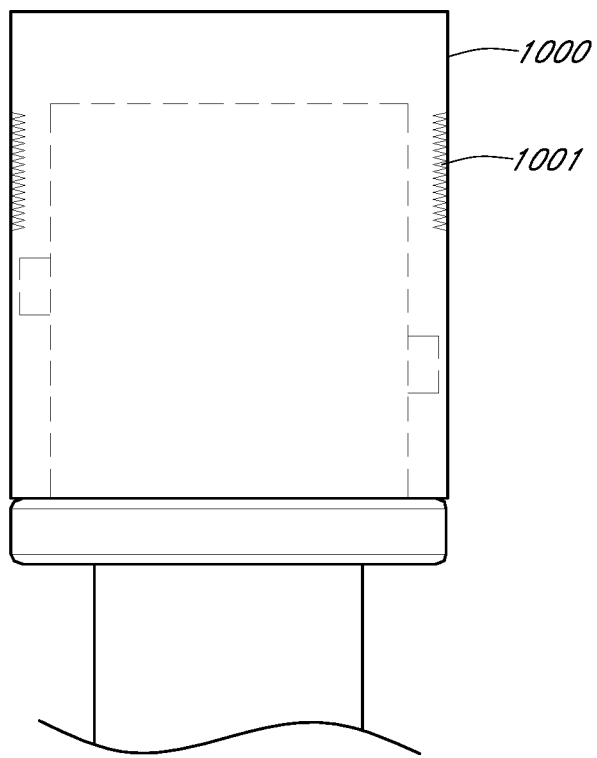
FIG. 10 illustrates a further gooseneck connection locking joint with anti-vibration feature for attachment to the back support in accordance with the present invention.
Figure 11:
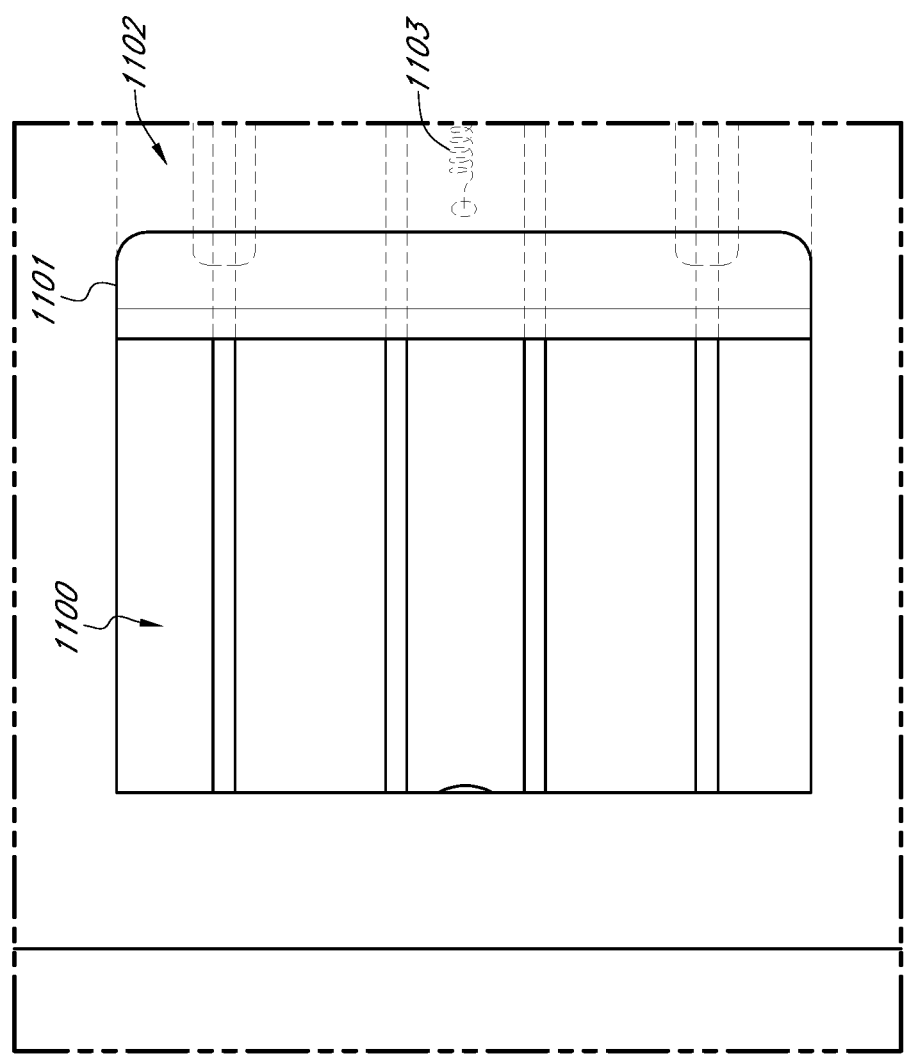
FIG. 11 illustrates an internal design for a sunken 4 ridge glide in accordance with the present invention.

In a further embodiment of the present invention, FIG. 10 illustrates a further gooseneck connection locking joint 1000 with anti-vibration feature 1001 for attachment to the back support in accordance with the present invention. In a further embodiment of the present invention, FIG. 11 illustrates an internal design for a sunken four-ridge glide 1100 in accordance with the present invention. Either or both side prongs 402, 403 may be mounted on such adjustable sunken four-ridge glide in accordance with the present invention. In a particular embodiment, only one side prong 403, 1101 is mounted 1102 on an adjustable sunken four-ridge glide 1100 and the adjustment mechanism is a tension spring 1103 drawing the adjustable side prong towards the fixed side prong. In a particular embodiment, the ridges of the sunken four-ridge glide enhance the smooth sliding action of the adjustable side prong and also add strength to the integrated support backing by serving as ribs.

Figure 12:
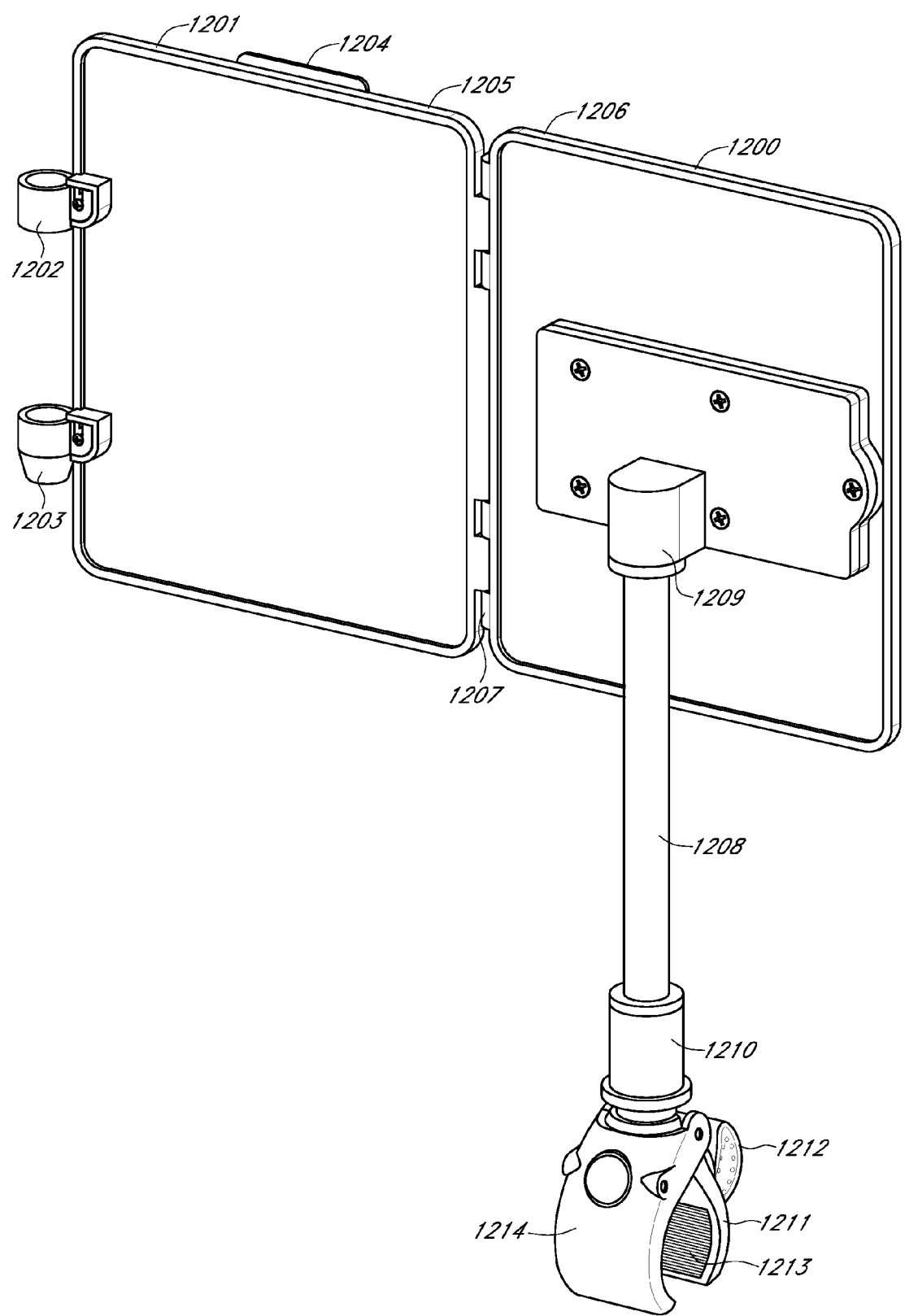
FIG. 12 illustrates a rear-view of the holder featuring a central backing support in accordance with the present invention.

In a further embodiment of the present invention, FIG. 12 illustrates a rear-view of the holder featuring a central backing support 1200, a moveable list backing support 1201, a pen holder, 1202, 1203, a finger press list holder 1204, a raised support ridge 1205, 1206, an offset raised knuckle hinge (shown in the fully opened position) 1207, a gooseneck connection 1208, connected at each end with a gooseneck connection locking joint 1209, 1210, and unique quick release clamping jaws 1211, 1214 with contour knob 1212 and gripping surface 1213.

Figure 13:
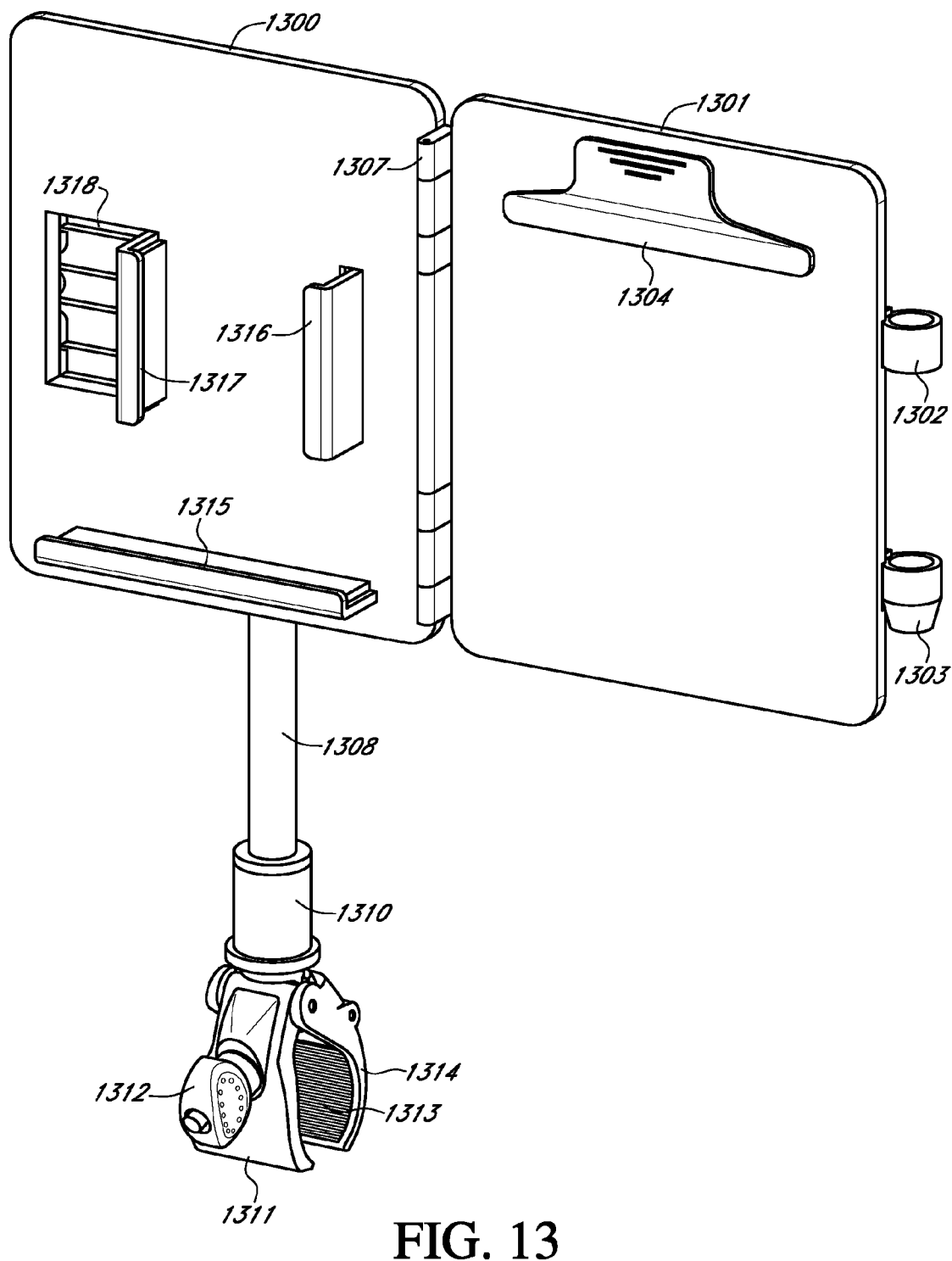
FIG. 13 illustrates a front-view of the holder featuring a central backing support in accordance with the present invention.

In a further embodiment of the present invention, FIG. 13 illustrates a front-view of the holder featuring a central backing support 1300, a movable list backing support 1301, a pen holder, 1302, 1303, a finger press list holder 1304, an offset raised knuckle hinge (shown in the fully opened position) 1307, a gooseneck connection 1308, connected with a gooseneck connection locking joint 1310, and unique quick release clamping jaws 1311, 1314, with contour knob 1312 and gripping surface 1313. In a particular embodiment, the central backing support 1300 further includes a three prong holder system for securely mounting a smartphone, tablet or other portable electronic device, featuring a fixed bottom prong 1315, a fixed side prong 1316, and an adjustable side prong 1317 mounted on a sunken four-ridge glide 1318.

Figure 14:
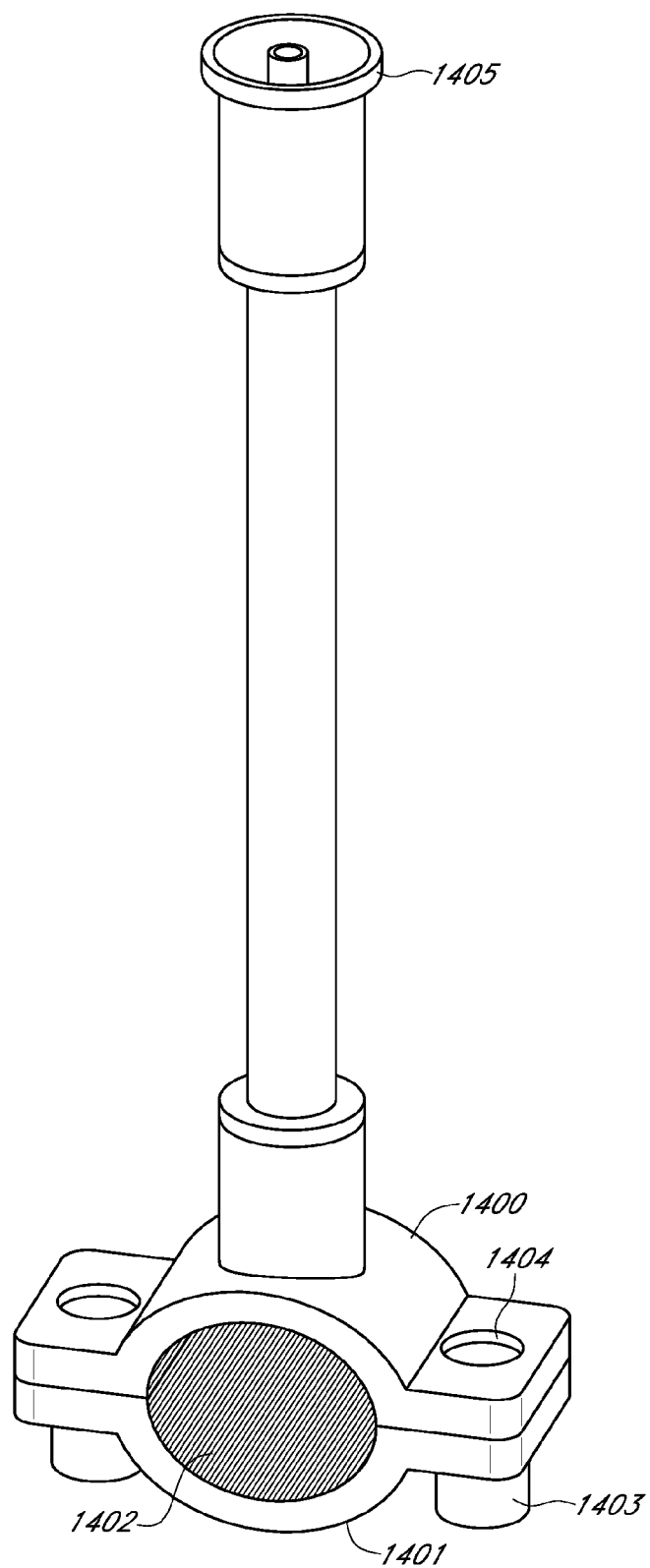
FIG. 14 illustrates a clamp for attachment of the gooseneck connection to the shopping cart, shopping basket, stroller, wheelchair or motorized wheelchair.

In a further embodiment of the present invention, FIG. 14 illustrates a unique semi-permanent clamp 1400, 1401 for attachment of the gooseneck connector to the shopping cart, shopping basket, stroller, wheelchair or motorized wheelchair. The semi-permanent clamp may prevent or discourage unauthorized removal of the device. The clamp may further include an integral tamper resistant coupling 1403, 1404 or tamper resistant screws, including security screwheads or one-way screwheads. In particular the semi-permanent clamp may comprise a dual clamshell mounting bracket 1400, 1401 to securely receive a tubular round rod or other handle shape, dual security screws, and a gripping surface 1402. The gripping surface may further comprise a ridged profile and may be made from ABS special adherence material, TPE or another rubberized material. The semi-permanent clamp should permit authorized persons, such as store employees, to easily attach and remove the clamp, but make it virtually impossible for shoppers or visitors to remove it.

The joint may further comprise a 180° pivot joint at the central backing support, which can securely adjust the device to a range of tilt angles, to include facing the user, facing upwards, and facing away from the user. The joint may further comprise a 360° rotating joint 1405 to allow the device to face upright in a 360° rotation about the axis of the support neck, for example to show another shopper something on screen or to face the screen towards a child riding in the shopping cart or stroller.

In a further embodiment of the present invention, the device is sized to hold most models of smartphone and to hold smaller tablet devices in a portrait orientation. In a further embodiment of the present invention, the device is sized to hold most models of tablet and larger models of smartphone in a landscape orientation. In a particular landscape tablet configuration, the central backing support is large enough to hold at least a tablet of 8 inches width and 6 inches height.

While several embodiments of the present invention have been illustrated and described herein, many changes can be made without departing from the spirit and scope of the invention. Accordingly, the scope of the invention is not limited by any disclosed embodiment.

The embodiments of the invention in which an exclusive property or privilege is claimed are defined as follows:

1. An apparatus comprising:
  a central backing support with an integral two-prong spring-tension clamp for securely gripping a smartphone, tablet or other portable electronic device;
  on each such prong, a gripping surface for making secure contact with such smartphone, tablet or other portable electronic device;
  a movable list backing support attached to the central backing support by a hinge;
  at least one spring-loaded clamp capable of holding a few sheets of paper or a pad of paper to the movable list backing support;
  a support neck connected to the central backing support; and
  a cart attachment connected to the support neck;
  wherein the apparatus is attachable to a shopping cart, shopping basket, stroller, wheelchair, motorized wheelchair or other shopping aid, through the cart attachment; and
  wherein the integral two-prong spring-tension clamp further comprises:
    a spring-action slide bar with 4 ridged grooves;
    a slide casing with 4 raised ridges aligned with the 4 ridged grooves to guide the motion of the spring-tension slide bar; and
    a tension-spring connecting the spring-tension slide bar to the slide casing.

2. An apparatus comprising:
  a central backing support with an integral two-prong spring-tension clamp for securely gripping a smartphone, tablet or other portable electronic device;
  on each such prong, a gripping surface for making secure contact with such smartphone, tablet or other portable electronic device;
  a movable list backing support attached to the central backing support by a hinge;
  at least one spring-loaded clamp capable of holding a few sheets of paper or a pad of paper to the movable list backing support;
  a support neck connected to the central backing support;
  a cart attachment connected to the support neck; and
  a holder for storing a pen, pencil, stylus or pointer in the apparatus;
  wherein the apparatus is attachable to a shopping cart, shopping basket, stroller, wheelchair, motorized wheelchair or other shopping aid, through the cart attachment; and
  wherein the holder further comprises a tapered pipe element having a central axis and a straight pipe element having a central axis, mounted co-axially such that the tapered pipe shaped element is beneath the straight pipe shaped element.

3. The apparatus of claim 2 wherein each holder element is mounted to the movable backing support by a removable screw attached through an integral U-shaped flange perpendicular to the axis of each such holder element.

4. The apparatus of claim 1 wherein the cart attachment is semi-permanent clamp for connecting the device to a typical shopping cart, shopping basket, stroller, wheelchair or motorized wheelchair.

5. The apparatus of claim 4 wherein the semi-permanent clamp comprises a two-part clamshell design secured with at least two tamper-proof screws.

6. The apparatus of claim 5 wherein the contoured thumb screw is a nut, the nut is secured to a bolt, the bolt passes through an elongated aperture in one jaw and is secured to the other jaw by placement of a pin cross-wise through the bolt head and the other jaw through cross-drilled hole.

7. An apparatus comprising:
  a central backing support with an integral two-prong spring-tension clamp for securely gripping a smartphone, tablet or other portable electronic device;
  on each such prong, a gripping surface for making secure contact with such smartphone, tablet or other portable electronic device;
  a movable list backing support attached to the central backing support by a hinge;
  at least one spring-loaded clamp capable of holding a few sheets of paper or a pad of paper to the movable list backing support;
  a support neck connected to the central backing support; and
  a cart attachment connected to the support neck;
  wherein the apparatus is attachable to a shopping cart, shopping basket, stroller, wheelchair, motorized wheelchair or other shopping aid, through the cart attachment;
  wherein the support neck is connected to the central backing support and the cart attachment by a joint providing an anti-shock and anti-vibration connection; and
  wherein the joint further comprises notched grooves and an enclosed casing for mating with the support neck.

* * * * *